3,784,484
ACTIVITY AND STRENGTH PROPERTIES OF REFORMING CATALYSTS BY ALUMINUM CHLORIDE LEACHING
William B. Innes, Upland, Calif., Malden W. Michael, Norwalk, Conn., and Stephen F. Adler, Santa Claus, Ind., assignors to American Cyanamid Company, Stamford, Conn.
No Drawing. Continuation-in-part of abandoned application Ser. No. 444, Jan. 2, 1970. This application Mar. 8, 1972, Ser. No. 232,932
Int. Cl. B01j 11/12
U.S. Cl. 252—442                4 Claims

ABSTRACT OF THE DISCLOSURE

This invention relates to platinum-alumina reforming catalysts and particularly to a process for manufacturing such catalysts which includes the step of leaching alumina with aluminum chloride.

---

This application is a continuation-in-part of application Ser. No. 444, filed Jan. 2, 1970, and now abandoned.

This invention relates to a process for preparing platinum-alumina reforming catalysts which includes the step of leaching alumina with aqueous aluminum chloride and to the catalyst materials obtained therefrom.

Platinum-alumina catalysts are employed in reforming proceseses to improve the fuel value of petroleum hydrocarbons of the naphtha boiling range. The catalyst must be capable of promoting the reforming reactions while being physically stable under normal reforming conditions. In addition, the activity and selectivity of the catalyst for promoting the reforming reactions, including dehydrogenation, dehydrocyclization, hydrocracking and isomerization, must be balanced in order to obtain an improved naphtha reformate. Many processing techniques are available which provide improved activity, selectivity and physical stability of the catalyst. For example, the presence of halogen in the catalyst improves the hydrocracking activity thereof. The halogen can be added by contacting the alumina particles of a suitable size and shape with hydrochloric acid or aluminum chloride. The alumina particles are recovered, dried and/or calcined to obtain the finished halogen-containing catalyst. However, the halogen content must be limited, otherwise the hydrocracking activity of the final catalyst will be excessive. This is undesirable since excessive hydrocracking activity in reforming processes causes excessive coke laydown which promotes a rapid decline of catalyst activity.

It is also known that the activity of platinum-alumina reforming catalysts can be improved by processes which include a step of leaching the alumina base with a strong acid such as nitric acid or hydrochloric acid. The leaching promotes the formation of interstices in the alumina and thereby increases the catalyst surface area. It is believed that this promotes more uniform distribution of platinum during subsequent platinizing steps as well as improved access of hydrocarbon reactants to the interior of the alumina during reaction. It is believed that the leaching results in the removal of absorbed basic impurities which may function as catalyst poisons. However, care must be taken during the leaching step since the acid converts a portion of the alumina to water-soluble salts which are removed. When excess alumina is so converted the physical stability of the catalyst is severely reduced. As presently practiced, the leaching results in the removal of between about 2 and about 15 weight percent of the alumina in order to obtain a satisfactory increase in catalyst activity while retaining adequate physical stability.

It is the object of the present invention to provide a process for improving the activity and selectivity of platinum reforming catalyst. It is a further object of the present invention to provide a process for making platinum reforming catalysts having improved activity and selectivity without removal of alumina therefrom. Further objects of the present invention will become evident in view of the following detailed discussion.

In accordance with the present invention, there is provided a process for producing platinum-alumina reforming catalyst of improved activity, selectivity, and physical stability which comprises contacting formed calcined alumina particles with an aqueous solution of aluminum chloride containing 0.4 to 1.0 part of aluminum chloride hexahydrate per part of alumina, maintaining contact between the alumina and the aqueous solution for a time period of at least 15 minutes, separating the thus treated alumina from the aluminum chloride solution, washing the separated alumina until the wash water is substantially free of chloride ion, drying and calcining the thus washed alumina, platinizing the calcined alumina and subsequently calcining the platinized alumina. Catalysts prepared by the disclosed process are characterized by improved activity, selectivity, and physical stability. Surprisingly, these improvements are obtained without a significant loss of alumina as a result of the property-improving treatment.

In preparing catalyst in accordance with the process of the present invention, the starting material employed is an active alumina previously formed into suitable size and shape, such as cylindical pellets, spherical beads, and other conventional forms. Although the alumina employed may be obtained from any source, it is preferred to use either a sol-type alumina, prepared by gelling and drying an aqueous alumina sol, or precipitated alumina obtained by neutralizing an aqueous alkali metal aluminate or aluminum salt solution and washing and drying the resulting aluminum hydroxide. Alumina from these sources is preferred because it produces gamma-alumina when calcined at temperatures within the range of 1000–1500° F., but it will be understood that the principles of this invention may be applied to alumina of other types. Various methods by which the useful forms of alumina can be obtained in the desired size and shape are well known in the art and form no part of the present invention. It is only necessary that the shaped alumina be subjected to calcination at a temperature in the range of between about 1000° F. and about 1500° F. prior to carrying out the present process.

The process of the present invention is particularly directed to the treatment of freshly prepared alumina particles. Treatment of spent catalysts presents problems with respect to platinum recovery or increased usage thereof which, coupled with generally shorter useful life of the re-activated spent catalyst, tend to render the present process unsuitable therefor. Treatment of previously platinized catalyst not previously used in catalytic processes also presents difficulties in platinum recovery, of increased usage thereof and tends to render the process unsuitable therefor.

The useful alumina particles, having been subjected to calcination as indicated above, are contacted with an aqueous solution of aluminum chloride in amounts such as to provide between about 0.4 and 1.0 part of aluminum chloride hexahydrate per part of alumina. The total amount of solution is not critical so long as the catalyst particles are uniformly contacted with such solution and its content of aluminum chloride hexahydrate is sufficient to meet the requirements specified above. Contact of the alumina particles with the specified aluminum chloride solution effects leaching of the particles. To ensure relatively quick leaching, aluminum chloride solutions of at least about 1 molar strength are employed at a temperature in the range of about 50 to about 150° F. The leaching, or contact of the alumina particles with the aluminum chloride solution, is then continued until particles of improved catalyst performance are obtained. The length of time required for leaching will be influenced by numerous factors including pore volume of the catalyst material being leached, the concentration of aluminum chloride in the leaching solution, the temperature at which leaching is carried out, and the extent to which improved performance is desired. Generally, there is an upper limit on the amount of improved performance that can be obtained and the major portion of this improvement is generally achieved within a period of 2 hours or less of leaching. Improved performance of the catalyst material is ordinarily achieved after a period of leaching of at least about 15 minutes. Although leaching times in excess of about 2 hours may be employed, the magnitude of increased performance resulting from the excessive time generally does not warrant the time expenditure. However, where a longer leaching time presents no inconvenience, such as in overnight leachings, such practice presents no difficulties. Accordingly, the only requirement as to the duration of leaching is that it effect improved catalyst performance and a minimum time of at least about 15 minutes should be employed to ensure the improved performance.

Whether or not a desirable improvement in catalyst performance has been achieved by leaching in accordance with the present invention can be readily ascertained by evaluation of the final catalyst material obtained in a catalytic process for which it is intended. An alternative method is to determine the physical properties of the catalyst and attempt to relate changes therein with potential performance improvements. However, property modifications where detected may not relate to performance improvements in many cases and, conversely, performance improvements may result without detectable property modifications. To avoid such problems in the present case, the catalyst materials leached in accordance with the present invention are evaluated directly in a suitable catalytic process for which they are intended and the benefits of the leaching process are readily apparent. Based on this and similar experience, it has been found that a minimum leaching time of about 15 minutes will result in improved performance of the final catalyst and, accordingly, such requirement as to the leaching step is made. In preferred instances, it is desirable to employ a leaching time of about one hour, both from standpoint of convenience and desirable performance improvements.

Although not wishing to be bound by any theory or mechanism, it is currently believed that leaching of alumina in an acidic medium results in formation of water-soluble salts as follows:

$$Al_2O_3 + 3H_2O \rightleftharpoons 2Al(OH)_3 \quad (I)$$
$$Al(OH_3) + 3H_3O \rightleftharpoons Al(H_2O)_6^{+3} \quad (II)$$

The hydrated aluminum ions (product of Equation II) are soluble and their dissolution in acid results in a loss of matter from the alumina promoting the formation of interstices therein. When, however, aluminum chloride is employed as the source of acid, the following reaction also occurs:

$$Al_2Cl_6 + 6H_2O \rightleftharpoons 2Al(H_2O)_6^{+3} + 6Cl^-  \quad (III)$$

Aluminum chloride undergoes hydrolysis forming the same hydrated aluminum ion as in Equation II. Consequently, the equilibria in both Equations I and II are shifted to the left and less aluminum dissolves. Thus, the present invention provides catalysts of improved activity and strength with minimal loss of alumina. It can be appreciated that because of dynamic equilibrium between aluminum ions in solution and alumina in contact with the aqueous aluminum chloride, some interchange of aluminum ions therebetween will occur. It is believed that such interchange can result in changes in structural features of the alumina catalyst material being leached without change in total alumina content thereof. The changes in structural features are thought to be responsible for the improved catalyst performance of the leached materials and generally reflect a change in pore volume distribution of the catalyst material. It is, of course, possible that undesirable ions present in the catalyst material, such as sodium ions, are also removed by the leaching step in an exchange reaction.

After the alumina has been leached for a sufficient time period, as indicated above, it is washed with water to remove all residual aluminum chloride. Completion of the washing can be conveniently determined by measuring the pH of the wash water after it has contacted the leached alumina. Ordinarily the washing is complete when the wash water pH is above 4.5 or slightly higher. The particles can be treated with a base as for example ammonium hydroxide to remove excess chlorine, if desired, prior to drying. The alumina is then oven-dried at about 200–300° F. and may be calcined at 1000–1400° F. or higher for about one hour.

After oven drying alone, or drying followed by calcination, the alumina, is impregnated with platinum by soaking in or being sprayed with a platinizing agent such as an aqueous solution of chloroplatinic acid ($H_2PtCl_6$) which preferably also contains a penetrant or penetration aid to assist thorough impregnation of the alumina by the platinum. The use of penetrants is known in the art; such acids as nitric and hydrochloric acid and acidic salts such as aluminum nitrate and aluminum chloride are preferred. Furthermore, the use of these penetrants either alone or in combination provides a convenient means for regulating the halogen content of the final catalyst. It is to be understood that the aluminum chloride employed in the leaching step is completely removed from the catalyst, while aluminum chloride, if employed during the subsequent platinizing step, is to remain in the final catalyst to obtain a final catalyst having the desired halogen content.

Presently employed commercial reforming catalyst normally contain about 0.2 to 1%, by weight, of platinum and 0.2 to 1.5–2.0%, by weight, of halogen, the balance being substantially all alumina. Chloroplatinic acid introduces about the same percent by weight of platinum as chlorine into the catalyst; e.g., a catalyst containing about 0.3%, by weight, chlorine and about 0.3%, by weight platinum can be obtained by platinizing with chloroplatinic acid.

In a specific embodiment of the present invention, naphtha hydrocarbons boiling within the range of about 200° F. to about 450° F. are contacted with the catalyst obtained by the process of the present invention at a temperature of from about 600° F. to about 1100° F., a total pressure of from about 50 to about 1000 pounds per square inch and a liquid hourly space velocity of from about 1 to 6. It is preferred that the naphtha be contacted with a plurality of catalyst beds in sequence, preferably from 3 to 5 beds. By operating with a plurality of catalyst beds, process advantage can be gained since dehydrogenation and hydrocracking reactions predominate in the initial stages and the dehydrocyclization reaction predominates in the later stages, and the reaction conditions can be regulated in each stage to afford the desired reactions.

The following examples illustrate the present invention and are not intended to limit the same. Unless otherwise specified, all percentages and parts are by weight.

EXAMPLE 1

Gamma-alumina pellets of ⅛" size, 200 grams thereof, were calcined at 1400° F. and then treated with an $AlCl_3$ solution comprising 155 grams of $AlCl_3 \cdot 6H_2O$ in 500 grams of water. The resulting mixture was agitated for about one hour at a temperature of about 35° C. The pellets were removed from the aluminum chloride solution and washed with water until the wash water had a pH of 4.6 so as to remove completely aluminum chloride from the pellets. The pellets were then mixed with 400 cubic centimeters of a 7% aqueous solution of ammonium hydroxide for about 10 minutes to remove chlorine. The pellets were removed from the ammonium hydroxide solution, dried at a temperature of about 250° F. and calcined at 1100° F. for one hour. An aqueous platinizing solution of the following composition was next prepared:

| | Grams |
|---|---|
| 5% Pt chloroplatinic acid | 18 |
| Al(NO$_3$)$_3$·9H$_2$O | 2 |
| Water | 75 |
| AlCl$_3$·6H$_2$O | 0.7 |

To the solution were added 150 grams of the leached pellets and impregnation was effected by mixing. The pellets were then dried at 250° F. and calcined at 1100° F. The pellets obtained contained 0.3 weight percent platinum and 1.2 weight percent chlorine.

EXAMPLE 2

An aluminum chloride leached platinum-alumina catalyst material was prepared in the manner described in Example 1. For comparison purposes, a second platinum-alumina catalyst was prepared in the same manner but with the exception that a 1 molar aqueous solution of HCl was employed as the leaching agent rather than aluminum chloride.

The catalysts of Example 1 and Example 2 were tested for activity in accordance with a standard reforming or hydroforming test employing 50 millimeters of catalyst in a quasi-isothermal reaction zone surrounded by an electrically heated block for temperature control. The test was carried out at a catalyst outlet temperature of 940° F. at a pressure of 200 pounds per square inch gauge, an hourly weight space velocity of 2, and a once-through hydrogen rate of 5000 standard cubic feet per barrel of feed. The feed was a virgin mid-continent naphtha having an ASTM distillation range of 210 to 356° F., a CFR-R octane number of 44 and an API gravity of 55.2°. The composition was 50% by volume of paraffins, a trace of olefins, 41.5% naphthenes and 8.5% aromatics. The results are shown in the following table.

TABLE I

| Leaching agent | HCl | AlCl$_3$ |
|---|---|---|
| Platinum (percent) | 0.3 | 0.3 |
| Chlorine (percent) | 1.2 | 1.2 |
| Initial activity: | | |
| Weight | 238 | 204 |
| Volume | 220 | 202 |
| Activity after 100 hours: | | |
| Weight | 130 | 128 |
| Volume | 119 | 126 |
| Al$_2$O$_3$ lost during leach (percent) | 10 | 0 |

The results in Table I show that the catalyst prepared by the process employing the aluminum chloride leaching step is of more lasting activity without a loss of alumina during the leaching step, as compared with the catalyst prepared with a hydrochloric acid leach.

We claim:

1. In a process for producing a platinum-alumina reforming catalyst of improved activity, selectivity and physical stability which comprises contacting formed calcined alumina particles with an aqueous solution of a leaching agent, maintaining contact between the alumina and the aqueous solution for a time period of at least 15 minutes, separating the thus treated alumina from the leaching agent solution, washing the separated alumina until the wash water is substantially free of undesirable ion, drying and calcining the thus treated alumina, platinizing the calcined alumina, and subsequently calcining the platinized alumina, the improvement which comprises employing as said leaching agent an aqueous solution of aluminum chloride containing 0.4 to 1.0 part of aluminum chloride hexahydrate per part of alumina whereby said improvements are obtained without a significant loss of alumina.

2. The process of claim 1 wherein the platinizing agent is chloroplatinic acid.

3. The catalyst produced by the process of claim 1.

4. The catalyst produced by the process of claim 2.

References Cited

UNITED STATES PATENTS

| 2,723,947 | 11/1955 | Oblad et al. | 252—466 Pt |
| 3,038,865 | 6/1962 | Abrahams | 252—466 Pt |

DANIEL E. WYMAN, Primary Examiner

W. J. SHINE, Assistant Examiner

U.S. Cl. X.R.

252—466 Pt